(12) United States Patent
Redshaw

(10) Patent No.: US 8,743,117 B2
(45) Date of Patent: Jun. 3, 2014

(54) PROCESSING OF 3D COMPUTER GRAPHICS DATA ON MULTIPLE SHADING ENGINES

(75) Inventor: Jonathan Redshaw, Hertfordshire (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 404 days.

(21) Appl. No.: 12/928,640

(22) Filed: Dec. 15, 2010

(65) Prior Publication Data

US 2011/0227921 A1    Sep. 22, 2011

(30) Foreign Application Priority Data

Mar. 19, 2010   (GB) .................................... 1004673.8
Aug. 18, 2010   (GB) .................................... 1013856.8

(51) Int. Cl.
    *G06T 15/50*    (2011.01)
(52) U.S. Cl.
    USPC ........................................................ 345/426
(58) Field of Classification Search
    None
    See application file for complete search history.

(56) References Cited

U.S. PATENT DOCUMENTS

| | | | | |
|---|---|---|---|---|
| 5,729,672 A | * | 3/1998 | Ashton | ........................ 345/589 |
| 6,570,155 B1 | * | 5/2003 | Prior et al. | ..................... 250/311 |
| 7,324,115 B2 | * | 1/2008 | Fraser | ............................ 345/553 |
| 2007/0101013 A1 | * | 5/2007 | Howson | ......................... 709/231 |
| 2007/0146378 A1 | * | 6/2007 | Sorgard et al. | ................. 345/581 |

FOREIGN PATENT DOCUMENTS

| | | |
|---|---|---|
| GB | 2 298 111 | 8/1996 |
| GB | 2 430 513 | 3/2007 |

OTHER PUBLICATIONS

"Efficient Parallel Implementations of Multipole Based N-Body Algorithms", William Theodore Rankin III, Apr. 1999.*
International Search Report of corresponding PCT/GB2011/000389.
"An Application Specific Reconfigurable Graphics Processor", by Hans Holten-Lund, IMM, DTI, Graphics Vision Day, 2003, pp. 1-27.

* cited by examiner

*Primary Examiner* — Said Broome
*Assistant Examiner* — William Beutel
(74) *Attorney, Agent, or Firm* — Michael S. Garrabrants

(57) ABSTRACT

A method for texturing and shading a 3D computer graphic image on shading engines. First, the image is subdivided into tiles and each tile is subdivided into micro tiles. An object list is allocated to each tile, the object list containing data defining objects visible in the tile. For one micro tile, it is determined which pixels in the micro tile are intersected by an object A in the object list and it is determined which pixels in the micro tile are intersected by at least one other object in the object list. In parallel with the determination step, pixel intersection data is outputted for an object B for which all intersection determinations for each of the micro tiles in a selected tile have been performed. The pixel intersection data is output to at least one of the shading engines.

18 Claims, 1 Drawing Sheet

PROCESSING OF 3D COMPUTER GRAPHICS DATA ON MULTIPLE SHADING ENGINES

FIELD OF THE INVENTION

This invention relates to the processing of 3D graphics data on multiple shading engines.

BACKGROUND OF THE INVENTION

In a 3D graphics system, the pixels on which a 3D image is to be rendered are typically subdivided into a plurality of rectangular areas or tiles. For example, in the applicant's UK Patent No. 2298111, the image is divided into tiles and the tiles are processed in turn. For convenience, these tiles are often grouped into what is known as macro tiles. Typically, a geometry processing unit receives image data from an application and transforms it into screen space using a well known method. The data is then supplied to a tiling unit which inserts the screen space geometry into object lists for each set of defined rectangular regions or tiles. Each of these lists will contain primitives (surfaces typically defined as triangles) that exist wholly or partially in a sub region of a screen, i.e. a tile. Therefore, there will be an object list for every tile on the screen. The tiles can then be rendered in turn using any known method until all the objects within each tile are processed.

Various methods are known for determining the depth of primitives for a particular pixel in a tile. These enable hidden surfaces to be removed and subsequently not processed for a pixel unless the closest surface to a view point is translucent. Typically, primitives will have tags associated with them indicating whether they are translucent or opaque.

An example of such a known rendering system is shown in FIG. 1, which is a schematic block diagram of a known rendering system. The rendering system comprises a Geometry Processing unit 2 which receives primitive data defining objects. This processes the objects to derive primitives such as triangles which are passed to a Tiling unit 4 which subdivides the image to be textured and shaded into a plurality of rectangular areas. Tile geometry lists are then produced in Tiled Screen Space Geometry Lists unit 6. These comprise lists of primitives which are potentially visible in each tile. A Hidden Surface Removal unit 8 then determines which surface or surfaces defined by the primitives are visible at each pixel in a tile before passing the data to a Texturing and Shading unit 10 which can apply texture and shading to the pixels, depending upon image attributes associated with the objects determined to be visible at each pixel.

Various methods are known for determining relative depths and also for determining whether it is appropriate to render data for a particular pixel or tile. One such system is shown in the applicant's International patent application number PCT/GB2004/002717 (publication number WO2005/015503). In this, for each pixel in a tile, objects are considered in turn in a depth sorting unit, with data relating to translucency. When a translucent object covers an opaque object at a pixel, data for the whole tile is flushed to a shading and texturing unit.

In previous embodiments, each triangle was assigned a unique entry in a lookup table (LUT), rather than sharing LUT entries for triangles with similar states. The processing order of spans was also line based, rather than micro tile oriented. This meant that it was impossible to associate triangles with left and right regions, because the whole width of a tile was considered in a single cycle. Because each triangle took a single LUT entry, this meant the LUT had to be large and expensive. The cost becomes more prohibitive as the tile becomes larger, as more triangles need to be stored in the LUT. However, this does enable a bounding box for each triangle (in this case a Y minimum and maximum since the whole width of the tile is considered at once) to be stored in the LUT. This meant that the outputting process becomes very simple. Initially the TAG ID Buffer is scanned to determine which LUT IDs are still visible after the processing of the pass (objects may be obscured by other objects appearing in front). Then the visible spans for the visible triangles (1 Triangle=1 LUT ID) are outputted, starting with the lowest LUT ID. Each LUT entry contains the original extent (Y Minimum to Y maximum) for the triangle, and the TAG ID Buffer is scanned for this extent to output the triangle.

In a deferred Z buffer system, a rasterisation pipeline receives a stream of primitives which intersect with a tile currently being processed. The information is received by a depth sorter which calculates the depth and rasterises the received triangle to determine whether or not the sample is visible. That is to say, it determines whether the primitive is in front of the previous objects for that pixel position in the Z buffer, and whether or not it is translucent.

If appropriate, the depth stored for a particular pixel may be updated and a mask indicating which samples should be textured and shaded for each pixel is passed to a tag sorter, which uses object data and associated tags for each pixel in texturing and shading.

SUMMARY OF THE INVENTION

Preferred embodiments of the present invention provide an improved method and system for a tag sorter which increases the efficiency of processing, such as texturing and shading for pixels in a tile based graphics system.

In particular, embodiments of the present invention seek to improve the efficiency with which a plurality of universal shading engines (USSE) or other generic shading units can operate to shade the pixels in tiles or portions thereof which are respectively allocated to them as primitives are passed from a rasterisation and depth sorting unit.

More specifically, according to the invention, there is provided a method for texturing and shading a 3D computer graphic image on a plurality of shading engines comprising the steps of: subdividing the image into a plurality of rectangular areas; subdividing each rectangular area into a plurality of smaller rectangular areas; allocating an object list to each rectangular area, the object list containing data defining objects visible in the rectangular area; for each smaller rectangular area in turn: determining which pixels in the smaller rectangular area are intersected by a next object from the object list and which pixels in said smaller rectangular area are intersected by a respective next object from the object list used on a previous pixel intersection determination for each respective other smaller rectangular area; outputting pixel intersection data for an object for which all intersection determinations for each of the smaller rectangular areas have been performed to shading engines allocated to each of the respective smaller rectangular areas; texturing and shading the pixels corresponding to the pixel intersection data for the said object with the shading engines; and storing data derived by the texturing and shading step for the pixels corresponding to the pixel intersection data.

According to the invention, there is also provided a method for texturing and shading a 3D computer graphic image on a plurality of shading engines comprising the steps of: a) subdividing the image into a plurality of rectangular areas; b) subdividing each rectangular area into a plurality of smaller rectangular areas; c) allocating an object list to each rectangular area, the object list containing data defining objects visible in the rectangular area; d) for one smaller rectangular area, determining which pixels in the smaller rectangular area are intersected by an object A in the object list and determining which pixels in the smaller rectangular area are intersected by at least one other object in the object list; e) in parallel with step d), outputting pixel intersection data for an object B for which all intersection determinations for each of the smaller rectangular areas in a selected rectangular area have been performed, to at least one of the plurality of shading engines; f) repeating steps d) and e) for each smaller rectangular area in the selected rectangular area in which there are visible objects; g) texturing and shading the pixels corresponding to the pixel intersection data for the object B with the at least one of the plurality of shading engines; and h) storing data derived by texturing and shading step g)

The method of the invention allows maximum load balancing between the plurality of shading engines to be achieved. This is possible in a system in which there is more than one triangle per LUT entry, so that the extent of the triangle in the image cannot be determined from the LUT, but has to be determined on a pixel-by-pixel basis.

There may be any suitable number of smaller rectangular areas in each rectangular area of the image. In one embodiment, there are four smaller rectangular areas in each rectangular area. In another embodiment, there are eight smaller rectangular areas in each rectangular area. Preferably, the smaller rectangular areas in each rectangular area are created by dividing the rectangular area in both the x and the y directions.

Preferably, the number of shading engines is equal to the number of smaller rectangular areas in each rectangular area. In that arrangement, for the texturing and shading of the image, each shading engine may be allocated to a particular smaller rectangular area of each rectangular area. Alternatively, the allocation of each shading engine to a particular smaller rectangular area may be on a per-rectangular area basis.

Preferably, each of the plurality of shading engines is allocated to a smaller rectangular area in each selected rectangular area, and the pixel intersection data output at step e) is output to the shading engine or engines allocated to those smaller rectangular area or areas in which object B is visible.

In a preferred embodiment, object A of step d) is the next object in the object list for the rectangular area including the smaller rectangular area, which is visible in the smaller rectangular area and which has not had pixel intersection data already determined for that smaller rectangular area.

The at least one other object of step d) may comprise a number of objects, the number being equal to the number of smaller rectangular areas in each rectangular area minus 1.

Preferably, the at least one other object of step d) comprises an object in the object list which has had pixel intersection data determined for all other smaller rectangular areas in the rectangular area.

More preferably, the at least one other object of step d) may further comprise: an object in the object list which has had pixel intersection data determined for all other smaller rectangular areas in the rectangular area except one, an object in the object list which has pixel intersection data determined for one other smaller rectangular area in the rectangular area and objects in the object list which have had each pixel intersection data determined for a respective number of smaller rectangular areas between one and all the smaller rectangular areas in the rectangular area except one. That is to say, preferably, the at least one other object of step d) comprises an object which has had pixel intersection data determined for one other smaller rectangular area, an object which has had pixel intersection data determined for two other smaller rectangular areas, an object which has had pixel intersection data determined for three other smaller rectangular areas and so on, up to an object which has had pixel intersection data determined for all other smaller rectangular areas in the rectangular area.

Step d) of determining which pixels in the smaller rectangular area are intersected by an object A in the object list and determining which pixels in the smaller rectangular area are intersected by at least one other object in the object list, may comprise using one or more masks indicating which objects should be shaded and textured at each pixel.

Step f) of repeating may comprise selecting smaller rectangular areas in turn by rotating around the rectangular area and repeating steps d) and e) for each smaller rectangular area selected in turn. Alternatively, step f) of repeating, comprises selecting smaller rectangular areas in turn using a Morton-order pattern and repeating steps d) and e) for each smaller rectangular area selected in turn. The order of selecting has been found to be important in some situations for load balancing between the plurality of shading engines. A Morton-order is also known as a Z-order.

Preferably, step g) of texturing and shading is performed for a second object B in parallel with step e) for a first object B. That is to say, as steps d) and e) are being repeated in accordance with step f), step g) of texturing and shading may be performed for the object for which pixel intersection data was outputted in the previously performed step e).

BRIEF DESCRIPTION OF THE DRAWINGS

A known rendering system has already been described with reference to FIG. 1, which shows a schematic block diagram of a 3D rendering system.

Preferred embodiments of the invention will now be described in detail by way of example with reference to FIGS. 2 and 3 of the accompanying drawings in which.

DETAILED DESCRIPTION OF THE INVENTION

As already discussed, the invention provides a method for texturing and shading a 3D image using a plurality of shading engines. The invention improves the efficiency of the shading engines by load balancing between the shading engines. The invention provides for the operation of pixel intersection determination for one or more triangles in a particular small rectangular area in parallel with outputting the pixel intersection determination results for another triangle.

Figure 1:
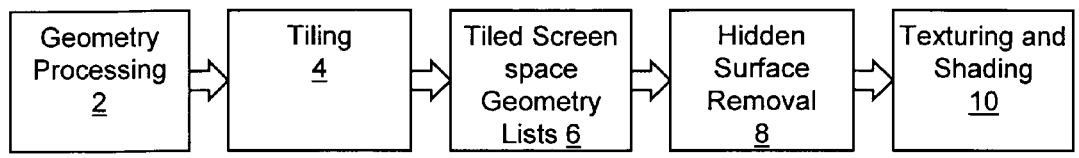
Figure 2:
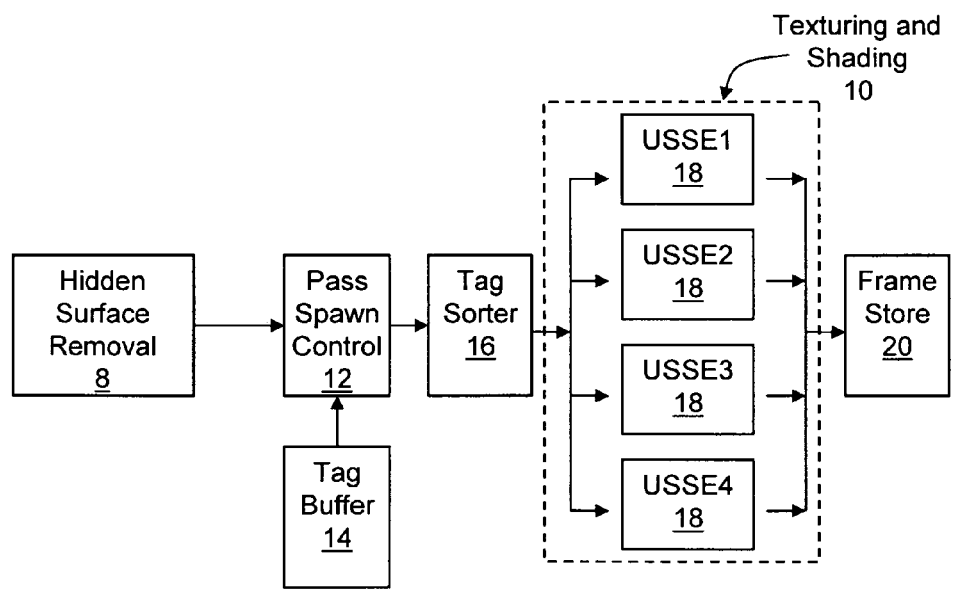
FIG. 2 shows a schematic block diagram of a modified portion of FIG. 1 embodying the invention.

FIG. 2 shows an embodiment of the invention which is implemented between the Hidden Surface Removal unit 8 and the Texturing and Shading unit 10 of FIG. 1. In the exemplary embodiment shown in FIG. 2, texturing and shading is performed on four parallel shading engines, in the form of four USSE's 18.

Preferred embodiments of the present invention, for example as shown in FIG. 2, provide an improved tag sorting method and apparatus which operates on a mask indicating which samples should be shaded and textured at each pixel. This mask is generated by a rasterising and depth sorting unit and at appropriate times, data is flushed from the rasterisation unit to a tag sorting unit which then controls a plurality of universal shading engines (USSE) to determine the shading to be applied to each pixel using the primitive data flushed to it via the rasterising unit.

In prior art systems, the tag sorting unit operates on a scanned base approach looking at a line of 16 pixels in a tile per clock cycle. Embodiments of the present invention have modified this approach to use a micro tile (e.g. 4×4 pixels) approach, for example, four USSE's for a single tile, each one allocated to a different region of the tile (each region referred to as a micro tile). These regions are typically top left (TL) top right (TR) bottom left (BL) and bottom right (BR). Each of these micro tiles may be, for example, four pixels by four pixels but other sizes and numbers of micro tiles are possible.

Efficiency of use of the USSE's is achieved by aiming to have all the USSE's operate on primitives which have a similar state (e.g. colour, texture). Thus, there is a move away from simply rendering pixels in rasterisation order. This restricts the number of times which USSE's need to be reconfigured to process different primitive data. This will now be discussed in further detail.

FIG. 2 shows an embodiment of the invention which is implemented between the Hidden Surface Removal unit 8 and the Texturing and Shading unit 10 of FIG. 1. In the exemplary embodiment shown in FIG. 2, a Pass Spawn Control unit 12 determines when to send object data for a tile to the Texturing and Shading unit. It does this by using tags associated with each pixel in a tile and a set of rules applied to these tags. Various different schemes are available. The tags for each pixel are stored in a Tag Buffer 14 and will generally indicate whether the near most object visible at a particular pixel, for the geometry processed so far, is translucent or opaque. When a translucent object is encountered at a pixel then it is usually necessary to flush object data, that has so far been processed by the Hidden Surface Removal unit 8 for a tile, to the Texturing and Shading unit 10.

Figure 3:
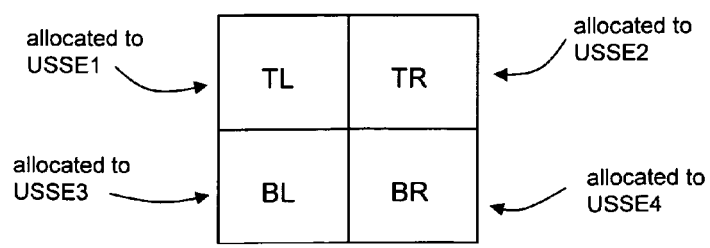
FIG. 3 shows the subdivided regions of a tile in an embodiment of the invention.

In the arrangement of FIG. 2, a Tag Sorter 16 is provided to control the allocation of object data to a plurality (in this case 4) of Universal Shading Engines (USSE) 18. The Tag Sorter 16 subdivides the tile or rectangular area being processed into a plurality of sub areas (micro tiles), one allocated to each respective USSE. The division of the tile into a plurality of micro tiles may be as shown in FIG. 3, in which the tile is divided into four micro tiles, a top left micro tile (TL), a top right micro tile (TR), a bottom left micro tile (BL) and a bottom right micro tile (BR). So, in this example a top left quadrant of the tile (TL) is allocated to USSE 1, a top right quadrant (TR) to USSE 2, and bottom left quadrant (BL) to USSE 3 and a bottom right quadrant (BR) to USSE 4.

The Tag Sorter 16 performs the function of scanning regions of the tiles for triangles and outputting triangle data to the four USSE's 18. This is done in a manner to ensure efficient use of USSE's 18.

When the Tag Sorter 16 initially receives a flush of data from the Pass Spawn Control unit 12, it has no knowledge of which triangles are visible in each region of a tile and therefore which ones need to be output to the USSE's.

In this embodiment, the Tag Sorter 16 commences by scanning the top left region (TL) for a first triangle A in the object list. Once this is completed, the next region, the top right region (TR) is scanned for the next triangle B from the objects flushed to the Tag Sorter 16 as well as scanning that region for the triangle A. Then the bottom left (BL) region is scanned for triangles A and B and also for a next triangle C. Finally the bottom right region (BR) is scanned for triangles A, B and C and also for a next triangle D.

Once this has been done, it will be appreciated that all four regions have been scanned for triangle A and the pixels for which that triangle is visible have been determined. The triangle can then be output to all four of the USSE's 18 which can process the relevant pixel intersections with A to texture and shade them and then pass the textured and shaded data to Frame Store 20.

The process then continues. On the next processing cycle, triangles B, C and D are initially allocated to the TL region and a full scan of the quadrant is performed for these triangles plus a next triangle E. After this all regions will have been scanned for triangle B and the Tag Sorter 16 can output triangle B to all USSE's 18 for texturing and shading and subsequent storage in Frame Store 20.

In the next cycle the TR region is considered again and a full scan performed on this for all pixels intersected by triangles C, D and E and the next triangle F. Triangle C has now been scanned for all regions and is output to the USSE's 18 for texturing and shading and subsequent storage in Frame Store 20.

In this embodiment, this process continues in quadrant order until all the triangles flushed by the Pass Spawn Control unit 12 have been textured and shaded for a tile. If there is further data to be processed for the tile then the same process will continue on a next flush of data from the Pass Spawn Control unit 12.

It will therefore be appreciated that, because there are effectively four pixel processing pipelines and a mask is built up indicating which triangles are present in each quadrant, the load is kept balanced by rotating the quadrant search. This means that a new triangle is output to each quadrant in turn. Efficiency is maintained by considering each triangle output for a quadrant across the whole tile, and outputting the spans for that triangle across the whole tile, so that the setup, state and texture fetches for any given triangle only have to be executed once within the tile. The selection of each triangle to be output in each quadrant during the search process is also important, as the application will attempt to minimise the transitions in state and texture. Whilst the load balance between the USSEs is important, it is also important to attempt to output those triangles which affect the scene in the same state order in which they were submitted. Triangles with the same state should preferably also be kept together. This is achieved by selecting triangles with minimum LUT entry, as LUT entries are allocated in incrementing order according to submission (if they are visible) i.e. similar states are grounded together in the LUT. Triangles with the same state will reference the same LUT entry, so all triangles with the same lowest entry for a LUT are output, before moving onto the next LUT entry.

Embodiments of the invention can be implemented in dedicated hardware or software or in a combination of the two. In this example tiles have been shown subdivided into four micro tiles. However, the invention can be implemented with more or fewer subdivisions and a corresponding number of USSE's to perform the texturing and shading for the invention. In addition, the micro tiles within a tile do not need to be selected in turn based on a rotation order, but may be selected in turn in any desired order.

Preferably triangles with similar states are provided in order by the tag sorting unit for scanning each region of a tile such that the USSE's can consider first triangles which have a common state. For example, there may be a number of triangles making up a single object which all require the same shading and texturing. Scanning regions for all of these triangles in turn will improve the efficiency of the system since it will not be necessary to reprogram the USSE's with different texturing and shading data until those triangles having a common state have all been textured and shaded. This will improve the speed of rendering since reprogramming of the USSE's with different texturing and shading data takes up additionally processing cycles.

There are a number of advantages of the scheme of embodiments of the present invention as follows. Grouping triangles with similar states under a single LUT ID reduce LUT storage requirements. Processing micro tiles allows for quadrant-based output of triangles. Outputting triangles in rotated quadrant order keeps the load balanced upon the USSEs. Other orders, such as a Z-order or Morton-order have also found to be effective for load balancing. (Referring to FIG. 3, a Z-order would be TL then TR then BL then BR, and a Morton-order would be TL then BL then TR then BR.) Generating a bounding box as part of the output process means that the bounding box is optimal, rather based upon the original input bounding box, i.e., it is based upon the final visible pixels, rather than the visible pixels when the triangle was processed.

The invention claimed is:

1. A method for texturing and shading on a plurality of shading engines, comprising:
    producing a respective object list for each rectangular area of a plurality of rectangular areas, each rectangular area bounding a respective set of pixels within an image to be rendered, each object list identifying objects that each provide a visible surface for at least one pixel in its rectangular area;
    allocating each of a plurality of smaller areas, which each bound a subset of the pixels of one of the rectangular areas and collectively bound all the pixels of that rectangular area, to a respective shading engine of the plurality of shading engines;
    scanning the plurality of smaller areas of a selected rectangular area in a repeating pattern, in which scanning comprises
    (a) accessing an object from the object list for that selected rectangular area,
    (b) determining, for the accessed object, and for one or more objects for which the scanning has begun, but not yet completed one iteration of the repeating pattern, which pixels, if any, in a current smaller area each of those objects provides a visible surface,
    (c) in parallel with the determining, for each previously-accessed object that has now completed one iteration of the repeating pattern, if any, outputting pixel intersection data that identifies each pixel, within the selected rectangular area, in which that object provides a visible surface, and
    updating the current smaller area to a subsequent smaller area in the repeating pattern, and repeating (a)-(c) at least once for each smaller area within the selected rectangular area, and after a first iteration, at least one object is accessed and at least one object completes each time the current smaller area is updated; and
    within each of the plurality of shading engines, texturing and shading the pixels within each smaller area allocated to that shading engine that are identified by the outputted pixel intersection data.

2. The method for texturing and shading on a plurality of shading engines of claim 1, wherein the accessed object comprises a plurality of primitives which have similar state associated with them.

3. The method for texturing and shading on a plurality of shading engines of claim 1, wherein the accessed object comprises a plurality of primitives, and further comprising accessing triangles that all reference a single entry in a lookup table before processing another triangle.

4. The method for texturing and shading on a plurality of shading engines of claim 1, wherein the outputting comprises forming a mask indicating which objects constitute a visible surface for each pixel in the rectangular area.

5. The method for texturing and shading on a plurality of shading engines of claim 4, wherein the forming of the mask comprises forming the mask to indicate which triangle, of a plurality of triangles constituting the object, is visible at each pixel in the rectangular area.

6. The method for texturing and shading on a plurality of shading engines of claim 1, wherein the accessed object is a current object in the object list.

7. The method for texturing and shading on a plurality of shading engines of claim 1, wherein the accessed object is selected because it is visible in the current smaller area.

8. The method for texturing and shading on a plurality of shading engines of claim 1, further beginning a pass spawn in order to begin the scanning with objects for which data currently exists in the object lists.

9. The method for texturing and shading on a plurality of shading engines of claim 1, further comprising generating a bounding box based on the pixels identified by the outputted pixel intersection data.

10. The method for texturing and shading on a plurality of shading engines of claim 1, wherein the repeating pattern comprises a selection from a rotating pattern, a Z order pattern and a Morton order pattern.

11. The method for texturing and shading on a plurality of shading engines of claim 1, further comprising performing the scanning on objects in an order in which they were submitted to a rendering system performing the method.

12. A system configured to shade a computer graphic image on a plurality of shading engines, comprising:
    a hidden surface removal unit configured to provide an object list for each rectangular area of a plurality of rectangular areas within the image being generated, each object list containing data defining objects visible in that rectangular area; and
    a tag sorter configured for scanning a plurality of smaller areas of a selected rectangular area in a repeating pattern, in which scanning comprises
    (a) accessing an object from the object list for that selected rectangular area,
    (b) determining, for the accessed object, and for one or more objects for which the scanning has begun, but not yet completed one iteration of the repeating pattern, which pixels, if any, in a current smaller area each of those objects provides a visible surface,
    (c) in parallel with the determining, for each previously-accessed object that has now completed one iteration of the repeating pattern, if any, outputting pixel intersection data that identifies each pixel, within the selected rectangular area, in which that object provides a visible surface, and
    (d) updating the current smaller area to a subsequent smaller area in the repeating pattern, and repeating (a)-(c) at least once for each smaller area within the selected rectangular area, and after a first iteration, at least one object is accessed and at least one object completes each time the current smaller area is updated
    wherein each of the plurality of shading engines are configured for shading the pixels within each smaller area allocated to that shading engine that are identified by the outputted pixel intersection data.

13. The system configured to shade a computer graphic image on a plurality of shading engines of claim 12, further comprising a pass spawn controller coupled to the hidden surface removal unit and configured to maintain a respective tag associated with each pixel of a rectangular areas being processed, from which it can be determined whether a currently visible surface at that pixel is opaque or translucent.

14. The system configured to shade a computer graphic image on a plurality of shading engines of claim 13, wherein the pass spawn controller is configured to flush object data responsive to encountering translucent object data at a pixel within the rectangular area being processed.

15. The system configured to shade a computer graphic image on a plurality of shading engines of claim 12, wherein the accessed object comprises a plurality of primitives, and further comprising accessing triangles that all reference a single entry in a lookup table before processing another triangle.

16. The system configured to shade a computer graphic image on a plurality of shading engines of claim 12, wherein the outputting comprises forming a mask indicating which objects constitute a visible surface for each pixel in the rectangular area.

17. A system configured to shade a computer graphic image on a plurality of shading engines, comprising:
    a hidden surface removal unit configured to provide an object list for each rectangular area of a plurality of rectangular areas within the image being generated, each object list containing data defining objects visible in that rectangular area; and
    a tag sorter configured for scanning a plurality of smaller areas of a selected rectangular area in a repeating pattern, in which scanning comprises
    (a) updating a group of triangles, wherein updating comprises removing a member of the group that was first added to the group, which has been processed for all smaller areas of the selected rectangular area, and adding a new member to the group,
    (b) determining and recording information about which pixels of a current smaller area within the rectangular area have a visible surface provided by any member of the group of triangles,
    (c) for the removed member of the group of triangles, outputting indications of all pixels visible for that triangle, within the rectangular area, to the plurality of shading engines, according to the recorded information, and
    (d) updating the current smaller area to a subsequent smaller area in the repeating pattern, and repeating (a)-(c), at least once for each smaller area within the selected rectangular area, and after a first iteration, at least one object is accessed and at least one object completes each time the current smaller area is updated
    wherein each of the plurality of shading engines are configured for shading the pixels within each smaller area allocated to that shading engine that are identified by the outputted pixel intersection data.

18. The system configured to shade a computer graphic image on a plurality of shading engines of claim 17, wherein the information recorded by the tag sorter comprises a mask for each triangle, the mask indicating for which pixels within the rectangular area that triangle constitutes a visible surface.

* * * * *